Oct. 19, 1937.  E. H. WATERMAN  2,096,077
EMERGENCY SUPPORT FOR BRAKE RODS AND BRAKE BEAMS
Filed Aug. 16, 1935
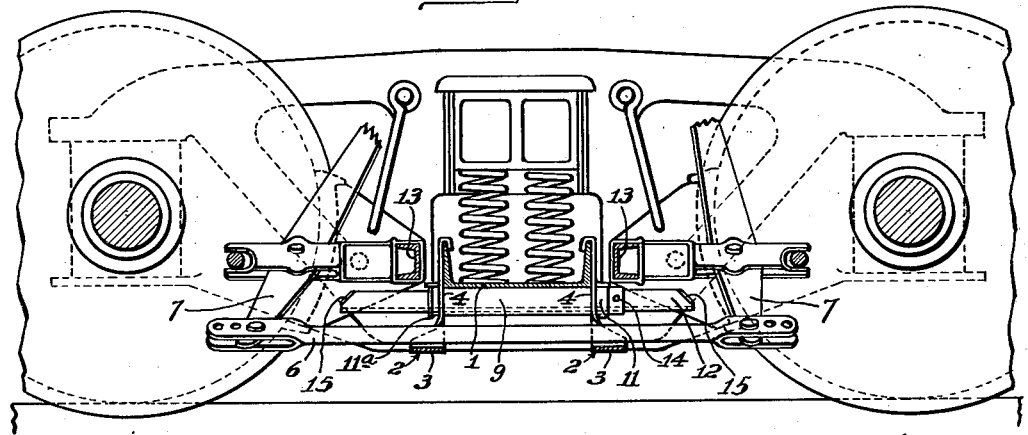
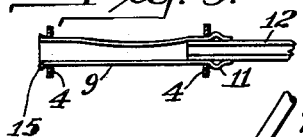
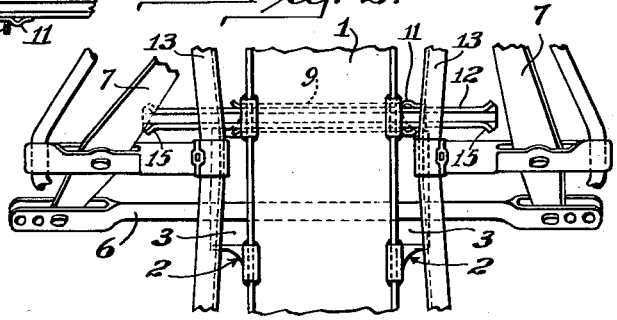
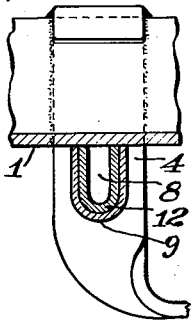
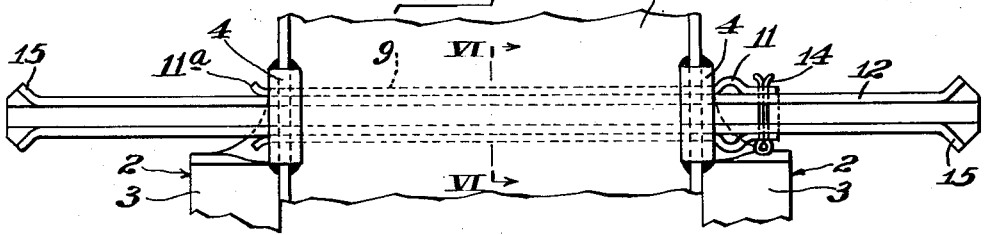
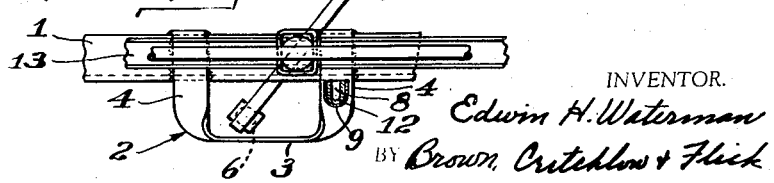
WITNESSES
INVENTOR.
Edwin H. Waterman
BY Brown, Critchlow & Flick
his ATTORNEYS.

Patented Oct. 19, 1937

2,096,077

UNITED STATES PATENT OFFICE 2,096,077

EMERGENCY SUPPORT FOR BRAKE RODS AND BRAKE BEAMS

Edwin H. Waterman, Munhall, Pa.

Application August 16, 1935, Serial No. 36,511

10 Claims. (Cl. 188—210)

This invention relates to safety supports for the bottom rods and brake beams of brake assemblies on railway car trucks, and has for its objects the provision of a safety support for this purpose which is simple in construction, easily assembled, dependable, substantially free from vibration relative to the truck, permanently locked to the truck, and displaceable to permit the brake beams to be dropped straight down when it is desired to remove them for replacement or repair.

The preferred embodiment of the invention is illustrated in the accompanying drawing in which Fig. 1 is a vertical section through a railway car truck; Fig. 2 is a fragmentary plan view of the safety support and adjacent members; Fig. 3 is an enlarged fragmentary plan view of the support; Fig. 4 is an end view of the safety support, partly in section, and adjacent members as viewed from the right in Fig. 2; Fig. 5 a fragmentary plan view of the support and its retaining member partly assembled; and Fig. 6 a sectional view to enlarged scale taken on the line VI—VI of Fig. 3.

Referring to the drawing, the railway truck is provided with the usual spring plank 1 in the form of a channel from each side of which a metal strap in the form of a stirrup 2 is suspended. Each stirrup has a horizontal base portion 3, and a pair of vertical side arms 4 the upper ends of which are bent over a side flange of the spring plank channel and either welded, riveted or otherwise rigidly attached thereto. Passing through the open areas of the stirrups beneath the spring plank is the bottom rod 6 to the opposite ends of which the lower ends of the truck levers 7 are pivotally connected. If for any reason the bottom rod accidentally drops, it is caught and supported by horizontal portions 3 of the stirrups and thereby prevented from falling upon the track and derailing the car.

As shown in Figs. 4 and 6, one arm 4 of each stirrup is provided with an opening 8 directly below the spring plank, and in these a guide member 9 is mounted. This is preferably a U-shaped member which is extended through the openings 8 with its upper edges bearing against the bottom of the spring plank. When it is formed one end 11 of this guide member is bulged outwardly sufficiently so that it will engage the stirrup and limit its movement through the openings 8 when it is initially installed, and after it is in place the opposite end 11a is also expanded or flared to prevent it from being withdrawn.

Slidably disposed in the guide member is an elongate supporting member or safety bar 12, also preferably U-shaped in cross section. The opposite ends of the safety bar project from the ends of the guide member and extend beneath the brake beams 13 of the truck. The safety bar is normally maintained in this position by a detachable locking member, such as a cotter pin 14, extending through registering apertures in the bar and the end of the guide member adjacent bulge 11. In case one or both of the brake beams accidentally drops down, it is caught and supported by the projecting ends of the safety bar below.

If at any time it becomes necessary or it is desired to remove a brake beam from the truck for replacement or repair, the obstruction to dropping it straight down, normally presented by the safety bar, is removed by first taking out cotter pin 14 and then sliding the bar longitudinally in the guide member away from the beam that is to be removed. However, the safety bar can not be removed entirely from the guide member and mislaid or lost, because its end corners 15 after assembly are turned laterally outward to prevent them from passing through the guide member. Preferably, one side of the guide member 9 is initially bowed inwardly sufficiently as shown in Fig. 5 to cause it to engage the safety bar with enough frictional pressure to prevent the latter from rattling in the guide member or moving therein with freedom.

A safety support constructed in accordance with this invention can be quickly assembled, and when once affixed to a car truck it remains attached although the safety bar can be slid from operative position to permit the brake beams to be easily removed from the truck when desired. The structure is a strong and dependable support for the brake beams as well as the bottom rod, and its various parts are protected from rattling and wear because they are connected tightly together to prevent them from vibrating.

According to the provisions of the patent statutes, I have explained the construction and operation of my invention, and have illustrated and described what I now consider to represent its best embodiment. However, I desire to have it understood that, within the scope of the appended claims, the invention may be practiced otherwise than as specifically illustrated and described.

I claim:

1. The combination with a spring plank of a railway car truck, of a safety support for the bottom rod and brake beams comprising a pair of stirrups having base portions disposed below said bottom rod and vertical side arms connected at their upper ends to said spring plank, a side arm of each stirrup being provided with an opening therethrough, an elongate member slidably disposed in said openings, and detachable means for normally locking the elongate member in fixed position in said openings with its opposite ends projecting therefrom for catching and supporting said brake beams in case they drop.

2. The combination with a spring plank of a railway car truck, of a safety support for the bottom rod and brake beams comprising a pair of stirrups having base portions disposed below said bottom rod and vertical side arms connected at their upper ends to said spring plank, a side arm of each stirrup being provided with an opening therethrough, an elongate member slidably disposed in said openings, and detachable means for normally locking the elongate member in fixed position in said openings with its opposite ends projecting therefrom for catching and supporting said brake beams in case they drop, said ends of the elongate member being formed for retaining it in said openings when said locking means is removed.

3. The combination with a spring plank of a railway car truck, of a safety support for the bottom rod and brake beams comprising a pair of stirrups having base portions disposed below said bottom rod and vertical side arms connected at their upper ends to said spring plank, a side arm of each stirrup being provided with an opening therethrough, a guide member extending through said openings and secured therein, an elongate member slidably disposed in said guide member, and means for normally locking the elongate member in fixed position in the guide member with its opposite ends projecting therefrom for catching and supporting said brake beams in case they drop.

4. The combination with a spring plank of a railway car truck, of a safety support for the bottom rod and brake beams comprising a pair of stirrups having base portions disposed below said bottom rod and vertical side arms connected at their upper ends to said spring plank, a side arm of each stirrup being provided with an opening therethrough, a guide member extending through said openings and secured therein, an elongate member slidably disposed in said guide member, and means for normally locking the elongate member in fixed position in the guide member with its opposite ends projecting therefrom for catching and supporting said brake beams in case they drop, said ends of the elongate member having laterally projecting portions for limiting the movement of the elongate member through said guide member when said locking means is removed.

5. The combination with a spring plank of a railway car truck, of a safety support for the bottom rod and brake beams comprising a pair of stirrups having base portions disposed below said bottom rod and vertical side arms connected at their upper ends to said spring plank, a side arm of each stirrup being provided with an opening therethrough, a guide member extending through said openings and secured therein, an elongate member slidably disposed in said guide member with its opposite ends projecting therefrom for catching and supporting said brake beams in case they drop, one end of the guide member and said elongate member being provided with registering apertures extending transversely therethrough, and a detachable member extending through said apertures.

6. The combination with a spring plank of a railway car truck, of a safety support for the bottom rod and brake beams comprising a pair of stirrups having horizontal base portions disposed below said bottom rod and vertical side arms connected at their upper ends to said spring plank, a side arm of each stirrup being provided with an opening therethrough, a guide member extending through said openings, said member being provided adjacent one end with a bulged portion and the opposite end of the member being flared to thereby lock the member in said openings, a safety bar slidably disposed in said guide member with its opposite ends projecting therefrom for catching and supporting said brake beams in case they drop, said bar and the end of the guide member adjacent said bulge being provided with registering apertures extending transversely therethrough, and a cotter pin disposed in said apertures.

7. The combination with a spring plank of a railway car truck, of a safety support for the bottom rod and brake beams comprising a pair of stirrups having horizontal base portions disposed below said bottom rod and vertical side arms connected at their upper ends to said spring plank, a side arm of each stirrup being provided with an opening therethrough, a guide member substantially U-shape in cross section, a safety bar slidably disposed in said guide member, one side of the guide member being bent inwardly to frictionally engage the safety bar, and detachable means for locking the bar in the guide member with its opposite ends projecting therefrom for catching and supporting said brake beams in case they drop.

8. The combination with the spring plank of a railway car truck of a safety support for the brake beams comprising a pair of spaced independent members secured to opposite sides of said plank and projecting below it, each of said members being provided with an opening therethrough, a guide member extending through said openings, an elongate member slidably disposed in said guide member, and means for detachably locking the elongate member in substantially fixed position in said guide member with its opposite ends projecting therefrom for catching and supporting said brake beams in case they drop.

9. The combination with the spring plank of a railway car truck of a safety support for the brake beams comprising a pair of spaced independent members secured to opposite sides of said plank and projecting below it, each of said members being provided with an opening therethrough, a guide member extending through said openings, an elongate member slidably disposed in said guide member with its opposite ends projecting therefrom for catching and supporting said brake beams in case they drop, one end of the guide member and said elongate member being provided with registering apertures extending transversely therethrough, and a detachable member extending through said apertures.

10. The combination with the spring plank of a railway car truck, of a safety support for the brake beams comprising a pair of brackets secured to opposite sides of said plank and projecting below it with axially aligned openings through their projected portions, a hollow metal member extending through said openings below the plank, the opposite ends of said member being provided with portions extending laterally of the outer faces of the brackets to lock said member and brackets together, and an elongate member disposed in said hollow member with its opposite ends projecting therefrom for catching and supporting said brake beams in case they drop.

EDWIN H. WATERMAN.